J. SCHIESSLER.
SUBMARINE SIGNALING APPARATUS.
APPLICATION FILED MAY 12, 1909.
1,099,998.
Patented June 16, 1914.
2 SHEETS—SHEET 1.
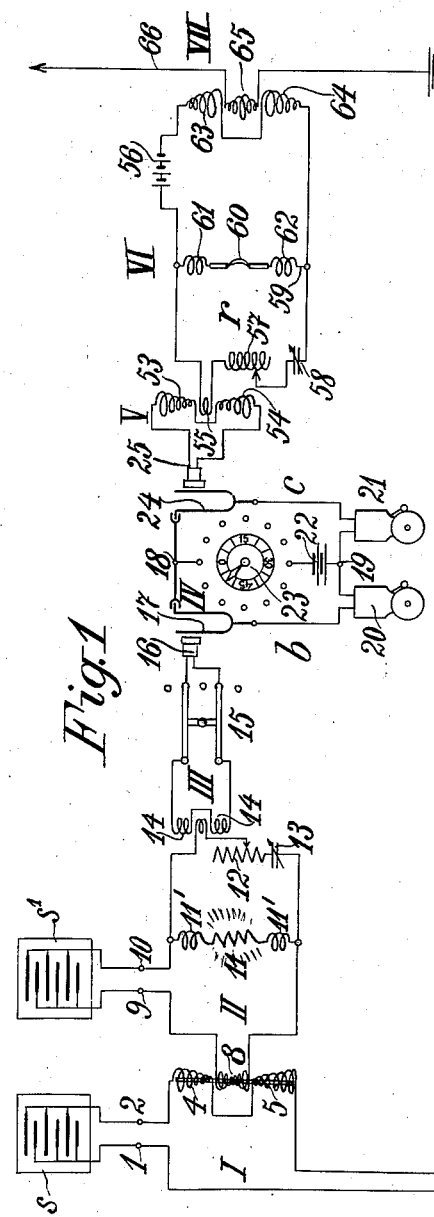
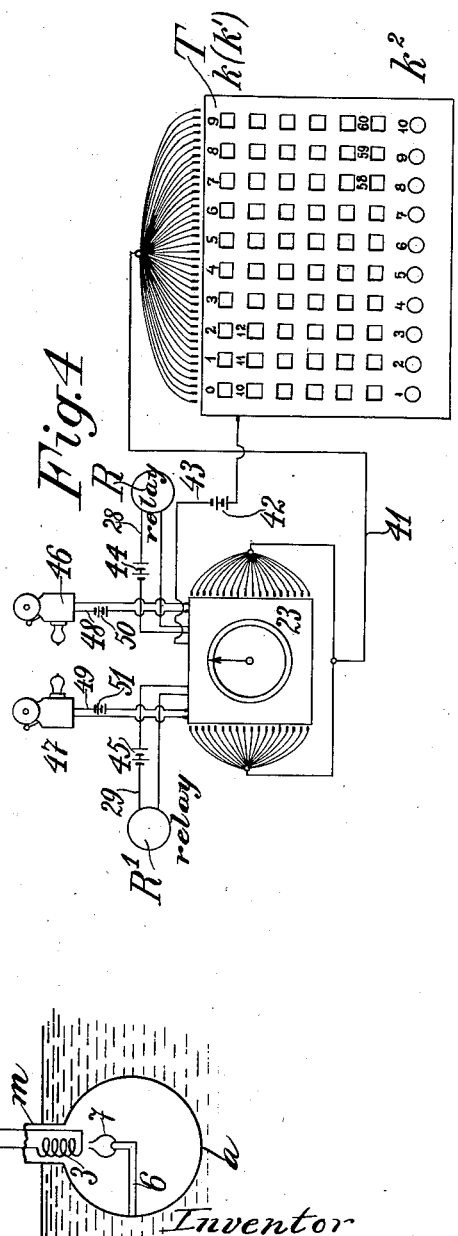
Witnesses.
B. Sommers
May Ellis
Inventor
Josef Schiessler
by Henry Orth Jr.
Atty

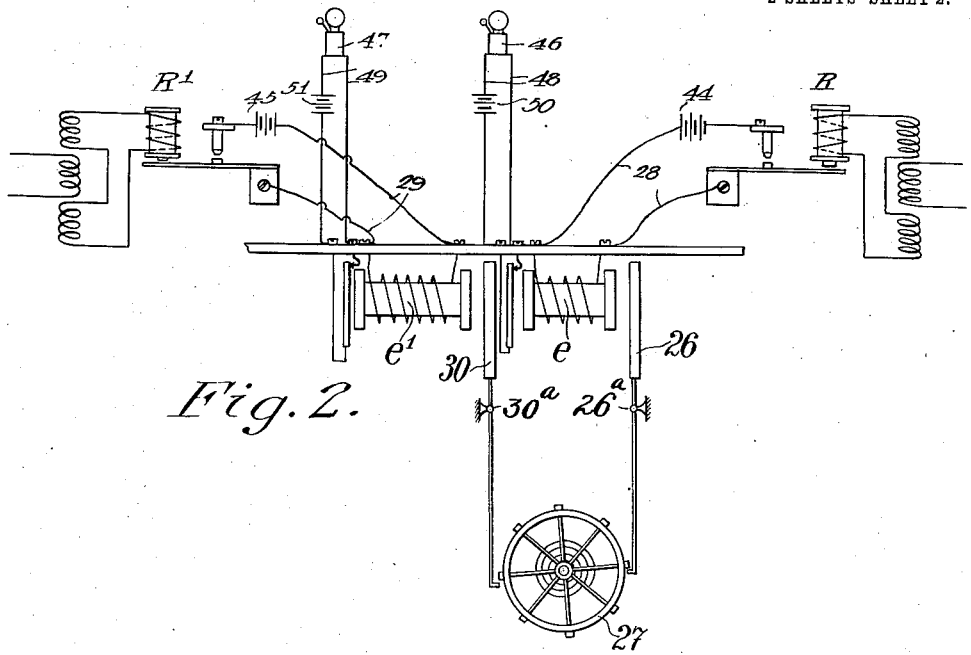
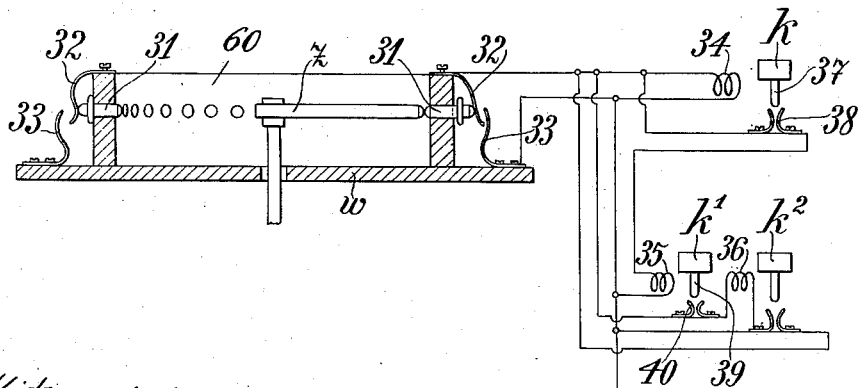

UNITED STATES PATENT OFFICE.

JOSEF SCHIESSLER, OF BADEN, NEAR VIENNA, AUSTRIA-HUNGARY.

SUBMARINE SIGNALING APPARATUS.

1,099,998. Specification of Letters Patent. Patented June 16, 1914.

Application filed May 12, 1909. Serial No. 495,527.

*To all whom it may concern:*

Be it known that I, JOSEF SCHIESSLER, subject of the Emperor of Austria-Hungary, residing at Baden, near Vienna, Austria-Hungary, have invented certain new and useful Improvements in Submarine Signaling Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to apparatus described in the specification filed with the application for U. S. patent on the 8th February 1908, Serial Number 414,998, for "improvements in submarine signaling apparatus".

The main object of the present invention is to provide improved apparatus for receiving or picking up syntonized sound signals under water and whereby the distance of a source of sound or of a point remote from the observer can be readily determined according to the principle which consists in measuring the time between the arrival of light waves i. e., electrical waves and sound waves which are sent out simultaneously from the remote point, after which the distance of this point from the observer is determined by a simple calculation of the time measured multiplied by the velocity of sound.

The apparatus for registering the time is, as a rule, so constructed that it indicates the time of the beginning of the sending out of the sound waves and then the instant of the arrival of the sound waves and also if necessary it indicates the distance of the object upon a scale empirically graduated for the normal speed of propagation of sound. The moment of beginning of the sending out of the sound wave is determined by the aid of electrical waves, in which, as is well known, the difference of time between the moment of sending thereof from a remote point and the moment of their arrival at the place of observation is so infinitely small that it is negligible even for the greatest distances occurring under such circumstances.

The utilization of electrical waves presupposes that a transmitter enabling such waves to be sent out is arranged upon the remote object.

The sound waves sent out by a suitable transmitter such as described in the above-mentioned application, are picked up by a resonator, which by its vibrations influences a resistance coil heated by a current. This resistance element, preferably in the form of a hot wire, is acted upon by the air vibrations produced by the resonator, and therefore increases and diminishes its resistance according to those vibrations. It is obvious that such an arrangement is a very sensitive one, much more than the microphone arrangements heretofore used, as it is well known that hot wires have an extreme sensitiveness with regard to fluctuations of the temperature and therefore the signaling distance heretofore obtained by microphone arrangement, which is about 25 km. can be considerably increased. Furthermore, the arrangement is such that the incoming weak waves are strengthened by a telephone relay if necessary of a kind forming the subject of a previous application for U. S. Letters Patent made by me on August 19, 1908, Ser. No. 449,345.

Referring to the accompanying drawing, Figure 1 illustrates diagrammatically an arrangement of apparatus embodying this invention for receiving or picking up signals under water. Figs. 2 and 3 show details of the clock work used in combination with the signaling apparatus. Fig. 4 illustrates the indicating tablet and its connection with the clock work.

The apparatus comprises seven circuits, namely, I. The microphone circuit. II. The circuit of the telephone relay. III. The inductive telephone circuit. IV. The circuit of the electrical chronometer and V. The circuit of the hearing receiver of a wireless system. VI is the relay circuit of the wireless system. VII is the antenna circuit in the wireless system.

From the plug contacts 1 and 2 of a suitable source of continuous electric current, for example, a storage battery situated at some suitable point at the place of observation, current is sent through an incandescent resistance 3 which is mounted in a rotating receiving apparatus *a* placed under water.

The sound detector *a* is of the kind fully described and shown in my co-pending application Serial No. 414,998. It consists of a casing submerged under water which is preferably ellipsoid or ball shaped, and is provided with a water-tight tube *m* passing through the bottom of the ship. A metal cylinder 6 projects into the casing, the outer end of which exposed to the water in some cases is formed as a solid rod or cylinder made of elastic material, for instance of some suitable metal. In any case its periphery is sound insulated. The inner end of the rod 6 or equivalent, projects into a chamber which contains the receiving device proper, including a resonator 7 which is tightly mounted upon the inner end of the tube or cylinder 6, and is tuned to a fixed tone. The sound vibrations coming in by the element 6 or transmitted through said element act on the air in the resonator. The air in the resonator is brought into strong free oscillations, owing to the fact that the vibrations transmitted have the same period as the resonator. The air vibrations thus produced when passing the nozzle of the resonator cool the incandescent resistance 3, which forms part of the circuit 1, rhythmically. By these means fluctuations of the resistance in the element 3 are set up which generate corresponding current fluctuations in the circuit I. This circuit includes two coils 4 and 5 located above the water and which are movably mounted upon an iron core common to both of them. Between these two coils 4 and 5 and upon their iron core is arranged a coil 8 which is connected up in series with an incandescent resistance 11 having a positive or negative temperature coefficient which is located between conducting wires 11' wound into coils and is fed with continuous current from plug contacts 9 and 10, connected for example to a storage battery $s'$. Parallel to the incandescent resistance 11, which is arranged, if desired, in a chimney after the manner of a Bunsen burner with an adjustable supply of air, lies a Thomson oscillating circuit which comprises an adjustable self inductance coil 12 and a variable condenser 13. It is obvious that in case the temperature coefficient of the incandescent resistance or hot wire 11 is a positive one, the oscillation circuit does not act as a high-frequency generator, as in the case with a negative coefficient, where the arrangement is that of a Thomson or Duddell circuit, but as a resonator for the oscillations superimposed on the circuit of the incandescent resistance, and has to be adjusted according to the frequency of these oscillations. The reinforcement or strengthening takes place in the main circuit by the fluctuations of heat, which increase in quadratic proportion to the current and in direct proportion to the resistance according to the well known law of Joule.

The telephone 16 in circuit III which acts as a filter, is magnetically i. e., inductively coupled to this oscillating circuit by means of a switch 15 and through secondary coils 14. This inductive coupling may however be carried out exactly as between the circuits I and II (the circuits of the microphone and of the telephone relay), that is to say with adjustment to resonance. The telephone 16 can however be coupled on electrically, i. e., capacitatively or purely galvanically, i. e., conductively.

In front of the telephone 16 arranged in the circuit III, a tuning fork 17 is so arranged in a circuit $b$ which is fed from a battery 22 that when the tuning fork vibrates the circuit is closed. The said device forms simply a so-called resonance relay. By this arrangement a "filtering" of the oscillations can be obtained, that is to say, that only oscillations of well defined frequency can pass the circuit III. The arrangement of the telephone 16 and the tuning fork 17, which acts, as above stated, as a resonance relay, is interposed between the telephone relay and the clock-actuating circuit so that oscillations other than those of the definite frequency can by no means pass. An energizing of the clock magnets, by oscillations not produced by the signals, is thereby prevented.

I do not wish to limit my invention to the use of an apparatus consisting of a telephone and a tuning fork, as it is obvious that other resonance relays may be used with the same effect and without departing from the scope of the invention.

By closing the circuit of the contact device of the said resonance relay an electromagnet arranged within the clock work 23 is energized which actuates a releasing device herinafter described, by means of which the pointer of the clock work is immediately set back to zero and the previous condition of the pointer is registered electromagnetically by making visible a mark and the current in the circuit through the clockwork cause a bell 20 to ring.

Referring now to the clockwork 23 the following is to be observed: The clock is built as a ship's clock, spring driven. The escapement is compensated so that it will run true in all climates and uninfluenced by magnetism. The stop-clock principle is somewhat altered so that the stopping of the hand is omitted and the control of the clock is accomplished by electrical impulses. The clock after starting is driven mechanically until a second current impulse returns the hand to zero position. For this purpose there are arranged in the clock two electromagnets $e$ and $e'$, Fig. 2, that operate to start and stop the clock similar to a stop clock or watch and also close the circuit of signals 46 and 47. The armature 26 of the electromagnet $e$ is pivoted at $26^a$ and has an extension beyond the pivot point that is moved into and out of the path of the teeth on the periphery of the balance wheel 27. The circuits of the clock device and the indicator which constitute the circuit IV of Fig. 1 are illustrated more fully in Fig. 4. The telephones 16 and 25 together with the tuning forks 17 and 24 which form the resonance relays, are indicated by R and R' in this figure. The resonance relay R, Fig. 4, closes circuit 28 upon operation of the wireless mechanism and the current passes from battery 44 to the magnet e which attracts armature 26 and releases the clock, which is now driven by its own mechanism. Upon the operation of the submarine mechanism a similar resonance relay R' is actuated and circuit 29 of battery 45 is closed to energize the magnet e' that attracts its armature 30 pivoted at 30ª and whose extension beyond the pivot point is moved into the path of the teeth of the balance wheel 27 to stop the clock. In the rim 60 of the clock dial, Fig. 3, are movable contacts 31, capable of being urged outward by the hand z against springs 32. The springs 32 are provided with platinum points capable of engaging the platinum points of spring contacts 33 to close an electric circuit. Each spring 33 is electrically connected to a drop of an annunciator and the circuits which are in parallel are supplied from a battery common to all of them. The annunciator T has sixty seconds drops numbered 0 to 59 and ten minutes drops numbered 1 to 10, Fig. 4. When the clock is released by the wireless mechanism the hand z operates the movable contacts 31 in succession to close the drop circuits in succession, energizing the electromagnets or windings 34, 35 to release the drops k. The zero drop and the 60 second drop are operated from the same drop circuit. The zero drop k carries an extension 37 that bridges normally open contacts 38 of a circuit counting the winding or electro-magnet 35 of a minute drop k'. Now when the seconds hand z has completed its revolution it again operates the zero 60 minute contact 31 and the circuit thereof is again closed, but inasmuch as this drop is down and closes the branch circuit containing winding 35, this winding will be energized upon the second operation of the zero contact to release drop 60. This drop k' for the 60th second bridges the open contacts 40 of a second parallel or branch circuit containing the winding or electro-magnet 36 that controls the minute drop $k^2$ and the first minute drop is actuated. After the drops have fallen they are raised in a well known manner.

Fig. 4 illustrates the relations of clock and annunciator T. The clock contact wires are united in a cable 41 leading to the annunciator T. A battery 42 included in the return wire 43 supplies the current for actuating the annunciator T. In the circuits 28 and 29 are sources of current 44 and 45, here shown as batteries. For indicating to the operator the reception of wireless impulses there is provided a circuit 48 having a battery signal 46 and lamp and for indicating the arrival of sound there is a circuit 49 having a battery 51 and signal 47 and lamp different from those in circuit 48. The minute drops are sufficient in number for all practical purposes since the propagation of sound in water is 1435 meters per second so that in 60 seconds the distance will be 1435×60=86100 meters or 86.1 kilometers and for ten minutes the distance will be 861 kilometers, especially in view of the fact that the practical limit of all other submarine signals based on the propagation of sound is about 30 kilometers. As already stated, electrical waves which are sent out from the remote point are utilized to signal the beginning of the sending out of the sound waves. To enable this to be effected, the battery 22 also feeds a second circuit c which is connected to the former circuit b at the distributing or junction points 18, 19 and includes in series the clockwork device 23, a bell 21 of a different tone to that of the bell 20 and a tuning fork 24. In front of the tuning fork 24 in a circuit V which acts as a filter similar to circuit III is arranged the hearing receiver 25 of a wireless apparatus which, by means of a telephone relay, can likewise be caused to strengthen the reproduction of the transmitted sounds.

The telephone is as shown arranged in a circuit V including coils 53, 54 which are influenced by an intermediate coil 55 arranged in a relay or amplifying circuit VI, which includes a current source 56, an adjustable resistance 57 and a variable condenser 58 in series with the said coil; a bridge 59 of the said circuit contains a glowing resistance for instance an arc lamp 60 between two electromagnets 61 and 62. The said circuit is inductively influenced by means of induction coils 63, 64, 65 from the antenna system 66 of any known kind. Supposing now the arrangement according to Fig. 4 be inserted in Fig. 1, instead of the circuit marked IV where the resonance relays 16, 17, and 24, 25 are substituted by relays of identical construction marked R and R' in Fig. 4, the operation is as follows: The electrical oscillations being the carriers of the signals, are first received by the antenna 66 which forms part of the antenna system VII. From there they are transmitted to the circuit VI of the telephone relay. This telephone relay preferably includes an incandescent resistance of positive or of negative temperature coefficient suitably arranged in the strong magnetic field of the electro-magnets 61 and 62 in series with said incandescent resistance. The oscillations set up in the incandescent resistance pass through the oscillation-circuit r including the adjustable self induction 57 and the adjustable capacity 58, and are then suitably transmitted to the circuit V of the resonance relay. The said resonance relay, as has been previously mentioned, consists of a telephone and a tuning fork connected and arranged substantially in the manner described in my co-pending application Serial No. 495526.

The relay R (Fig. 4) closes the circuit 28 in which battery 44 is included, whereby the magnet e (Fig. 2) is energized, which releases the clock 23 and closes the circuit 48 of the optical or acoustical signal device 46. Upon the release of the clock the pointer of the clockwork device, which stands at zero, begins to move forward in seconds exactly as in the case of known second clocks for measuring the velocity of sound, etc. This hand closes a contact at every second, all of these sixty contacts being connected in parallel. At each closing of a contact a drop at the annunciator on which the distances are marked, is operated. In the meantime sound waves from the remote point, the velocity of which amounts to about 1435 meters per second, are still on the way. When they arrive at the receiver they pass through the tube or elastic metal rod 6 and cause the resonator 7 tuned to the same frequency as the incoming vibrations to vibrate conjointly therewith. These vibrations of the resonator influence the resistance coil 3 heated by the current by cooling down or in the case of suitable action on the radiation, by heating up and thus set up fluctuations of resistance and current which are analogous to the vibrations of the resonator and which are transmitted to both the coils 4 and 5 and in consequence thereof vary the magnetic field thereof to correspond. A microphone may also be obviously inserted instead of the glowing resistance coils, i. e., thermophone. The fluctuations, which are of themselves very weak, may be strengthened in a twofold way. Firstly by increasing the resistance variations, which of themselves are small, by an external constant force. This is accomplished by increasing the cooling down by a constantly supplied current of air, the incandescent coil arranged in a chimney, i. e., after the manner of a Bunsen burner, either causing the blast of air itself by the ascent of the heated air or the air may be drawn away or fresh air forced in, by a rotary turbine pump or the like. Secondly these vibrations of the circuit I, i. e., the microphone circuit, are transmitted to the circuit II of a telephone relay described in the specification of U. S. application Ser. No. 449,345 by magnetic inductive coupling wherein the coil 8 of the strong current is mounted between the movable coils 4 and 5 on the same iron core, whereby all the lines of force pass through the coil 8. The strong current circuit II is taken from the terminals 9, 10 and contains either a positive or a negative incandescent resistance the supply wires of which are wound into a coil and inductively influence the likewise solenoid-like wound incandescent resistance. The current fluctuations set up in the coil 8 by induction are transmitted to the negative or positive incandescent resistance and strengthened by external forces namely by the cooling down of the same and by the action of the magnetic fields of the conductor wires wound into a coil, the influences being mutual. A further strengthening is effected by the Thomson (Duddell) oscillating circuit. By magnetic, i. e., inductive, coupling either in known transformer connection shown or analogous to the connection of the coils 4, 8, 5 the vibrations thus strengthened are transmitted to the telephone 16 which excites the harmonized tuning fork 17. Instead of the tuning forks 17 and 24 a monotelephone relay tuned to the same tone may also be used. The resonance relay thus formed by the coöperation of the telephone and the tuning fork which is marked R in Fig. 4, closes a circuit 29 to stop the clock, the pointer of which will spring back to zero. The position of the pointer at the time it was stopped will be indicated in the manner previously described, by means of an indicating flap or tablet upon which the product of the velocity of sound multiplied by the time, (that is the distance in kilometers or in nautical miles) is inscribed. At the same time, and likewise by electromagnetic action the bell 46, which still continues to ring, is cut out of circuit, and the other bell, 47 (together with the optical signal) having a different tone is switched into circuit, whereby the arrival of the sound waves is immediately signaled. The number of seconds which have elapsed from zero to the indication mark gives the duration of time of the sound vibrations. According to the general formula $s=ct$, wherein $s=$distance, $c=$velocity of sound (1435 meters) and $t$ the number of seconds which have elapsed from beginning to end, $s$ is now calculated and fixed upon the mark. This however is only possible when the transmitting and receiving stations are provided with a wireless system and when the transmitting station is to be found. When however this is not the case, but the signals are only to be picked up, then the following consideration leads to a workable formula.

By the classic researches of Tyndall it is proved that the permeability of the air to sound is not the same at all times and that one and the same signal of constant intensity will be perceived at one time at a greater and at another time at a lesser distance. These differences vanish entirely for the conduction of sound in water as water is an ideal conductor of sound. The reaching distance for one and the same apparatus is therefore a constant quantity. If for example the maximum sensitiveness or hearing distance for a syntonized receiver be 50 kilometers, it may be said that at the instant in which the sound signal is marked by a bell indication, that presupposing that the conditions are normal, the syntonized transmitter is 50 kilometers off, that is to say that a ship to which the apparatus is fitted just comes within earshot the extent of which is a circle with a radius of 50 kilometers. If the sound disappears the distance is naturally greater than 50 kilometers. If the syntonized sound transmitter approaches, the speed of the vessel can be calculated according to Doppler's principle, as is set forth in the specification of U. S. application Ser. No. 414,998 before mentioned and then, by multiplication with the time elapsed since the commencement of the observation, the distance covered by the ship can be determined and which distance subtracted from the maximum reaching distance, gives the distance of the ship. If S denotes the maximum reaching distance, $s$ the distance of the ship from the observer, $c$ the speed thereof determined according to the principle of Doppler and $t$ the time which has elapsed during the observation, then $s = S - ct$.

It will be observed that circuit II acts as an amplifying means for circuit I and that circuit III and its pertaining tuning fork 17 acts as a filter for circuit II permitting only definite vibrations to control the stopping of the clock. The wireless mechanism is similarly arranged the circuit VI being the amplifying means and the circuit V and pertaining tuning fork acting as a filter permitting only definite vibrations to control the starting of the clock.

I claim:—

1. In a signaling apparatus a clock, a wireless receiving mechanism including amplifying and filtering means to set the clock in operation, sound receiving mechanism including amplifying and filtering means to subsequently stop the clock and registering mechanism to automatically register the time interval between the starting and stopping of the clock and thereby the interval elapsed between the reception of the wireless electric signal and the sound signal.

2. In a signaling apparatus a wireless receiving mechanism, a sound receiving mechanism, a clock and means to start the clock from the wireless mechanism upon the production of a definite signal and means to stop the clock upon the production of a definite sound.

3. In a signaling apparatus a wireless receiving mechanism including a telephone, a sound receiving mechanism including a telephone, a stop clock, means actuated from the telephone of the wireless mechanism and responsive to definite vibrations to start the clock and means actuated by the telephone of the sound receiving mechanism and responsive to definite vibrations to stop the clock.

4. In a signaling apparatus, a sub-aqueous sound receiver, and an electric circuit containing an incandescent resistance adjacent said receiver and whose resistance is varied by the vibrations from said receiver.

5. The combination with a stop clock, a wireless receiving mechanism to start said clock including amplifying means and filtering means and a sound receiving mechanism to stop the clock comprising amplifying means and filtering means.

6. In a signaling apparatus, a submarine sound receiver actuated by sound waves from a resonator an electric circuit comprising an incandescible resistance in proximity to the receiver whose resistance is varied by the vibrations from said receiver, and an incandescent winding above water and an amplifying circuit having a winding in magnetic relation to the aforesaid winding.

7. In a signaling apparatus the combination with a sound receiver actuated by sound waves from a resonator, an electric circuit comprising an incandescible resistance in proximity to said receiver, and a conical winding, of a second amplifying circuit containing a winding in proximity to the aforesaid winding, a variable condenser and adjustable resistance and a resistance connected across said circuit and parallel with the condenser and adjustable resistance, said resistance cooled by a current of air.

8. In a signaling apparatus, a submarine sound receiver, an electric circuit containing two adjustable windings, a core common to both of them, and an incandescent winding adjacent said receiver, an independent amplifying circuit containing a winding on said core, an adjustable condenser and adjustable resistance and an incandescible resistance cooled by a current of air across said circuit and in parallel with the condenser and adjustable resistance, a telephone circuit including a telephone, in inductive relation to the amplifying circuit, a tuning fork in proximity to the telephone, a clock, and mechanism operated by the tuning fork to stop the clock.

In testimony that I claim the foregoing as my invention, I have signed my name in presence of two subscribing witnesses.

JOSEF SCHIESSLER.

Witnesses:
JOSEF RUBARDI,
ROBERT W. HEINGARTNER.